United States Patent [19]

Hirakawa

[11] Patent Number: 4,815,513
[45] Date of Patent: Mar. 28, 1989

[54] ANTI-SKID DEVICE FOR PREVENTING SLIPPAGE OF AUTOMOBILE TIRE

[76] Inventor: Kiyohiro Hirakawa, No. 33-banchi, Higashi 14-chome, Kita 19-jyo, Higashi-ku, Sapporo-shi, Hokkaido, Japan

[21] Appl. No.: 92,611

[22] Filed: Sep. 3, 1987

[30] Foreign Application Priority Data

Sep. 9, 1986 [JP] Japan .................................. 61-211952

[51] Int. Cl.$^4$ ........................ B60C 27/06; B60C 11/06
[52] U.S. Cl. .................................... 152/210; 152/208; 152/222; 152/241; 188/4 R
[58] Field of Search ............... 152/210, 208, 222, 221, 152/242, 241; 188/4 R

[56] References Cited

U.S. PATENT DOCUMENTS

3,147,790  9/1964  Viscardi .............................. 152/208
4,598,749  7/1986  Mandekic ........................... 152/210
4,676,289  6/1987  Su ...................................... 152/210

Primary Examiner—Merrell C. Cashion, Jr.
Assistant Examiner—Thomas Bokan
Attorney, Agent, or Firm—Parkhurst, Oliff & Berridge

[57] ABSTRACT

An anti-skid device for preventing slippage of a wheel is disclosed. The anti-skid device comprises a cylindrical expandable member disposed on a tread portion of a tire, and compressed fluid supplying means. The expandable member has anti-skid members implanted at a radially outer portion of the expandable member, and the expandable member is formed with a hole at a radially inner portion thereof. The compressed fluid supply means is connectable to the hole of the expandable member. The expandable member is expanded upon supply of compressed fluid into the hole, and is shrunk upon discharge of the compressed fluid therefrom.

17 Claims, 9 Drawing Sheets

ANTI-SKID DEVICE FOR PREVENTING SLIPPAGE OF AUTOMOBILE TIRE

BACKGROUND OF THE INVENTION

The present invention relates to an anti-skid device for preventing an automobile tire from its slippage, and more particularly, to a type thereof wherein anti-skid members project from the retract into a road contacting surface of the tire in accordance with changeable road surface conditions.

The road surface condition is frequently changed by the weather conditions, localities, sunny or shadow place, daytime or night time. The road surface condition is particularly changed during early winter season, and early spring season. For example, the road surface is covered with snow, or freezing or icy or dry road surface may result.

Conventionally, during snow falling season, a chain is mounted over an automobile tire to prevent slippage accident. Alternatively, an ordinary tire is replaced by a spiked or studded tire. Further, various types of apparatus have been proposed in which anti-skid members is projectable from and retractable into a road contacting surface of the tire.

The chain is effective for preventing tire from slippage against road surface covered with heavy snow or against frozen road surface. However, rather high skill is required for mounting the chain over the tire. It would be difficult and troublesome for the mounting work under bad weather condition such as heavy snow falling and snowdrift. Further, the chain mounted tire may degrade runing comfortableness, and may disadvantageously provide sideslip and skidding. Therefore, the chain-mounted tire may provide degradation of safty. Furthermore, the chain may be broken, if the vehicle runs for a prolonged period on a frozen road surface which is a border to the noncovered and nearly exposed road surface.

The spiked tire would be inferior to the chain-mounted tire when the vehicle runs on a heavily snow-covered road, while the spiked tire is available for running on frozen road or compressed snow covered road. However, as described above, the road surface condition is changeable, particularly during early winter and early spring seasons. For example, the snow may be melted and road surface is dried, or there are several icy portions on the road.

If the vehicle with the chain-mounted tires or spiked tires runs on road whose surface is exposed to the atmosphere, noise is generated, and the road surface is excessively damaged. The damaged surface may cause public pollution such as particle ladden atmosphere. For this, there are several regulations which prohibits the use of spiked tire in West Germany, Norway, Sweden, Holland, Miyagiprefecture Japan, etc. If the operator removes or mounts the chain or exchanges the spiked tire by the normal tire and vice versa in accordance with the change of the road surface, such public pollution can be obviated. However, chain removal and attachment work and tire replacement work may require about 20 to 30 minutes for a skilled operator, and it would be rather impossible to conduct such work in accordance with the road surface chage, since the road surface is frequently changeable by weather condition, localities, and time.

In order to overcome the above-described drawbacks, proposed were various device which allow spike pins to project from the retract into a road contacting surface of the tire. However, so far, no actual device has been put into practice.

This types of device is described in, for example, Japanese Utility Model Publication No. 52-3762, Japanese Patent Application Publication (Kokai) Nos. 50-83902, 53-133801 and 53-104908. In these publications, spike pins themselves directly projects out of the tire. Particularly, according to the publication Nos. 50-83902, 53-133801 and 53-104908, each of the spike pins is connected with projecting mechanism.

In the conventional spiked tire, it is necessary to embed about 100 to 150 number of spike pins at a tread portion of the road contact surface of the tire. In the device wherein the spike pins directly project out of the tire, required are water proof, dust proof and air-tight structure for holes which allow spike pins to pass therethrough. However, there is no structure which can fullfil these requirements. Therefore, various disadvantages are caused, and it would be doubtful whether or not the spike pins surely project from and retract into the tire during actual running of the vehicle. Even if water proof means is provided at the holes, frictional resistance may be increased between the spike pins and the holes, which resistance may render the spike pin incapable of its projection and retraction.

In another aspect, when the vehicle with installed spiked tires runs for a long time on the mountain road on which thin frozen ice is covered, relatively large amount of frictional heat is generated between the spike pins and the road surface. Therefore, rust may be generated at the spike pins due to high frictional heat and water or moisture, and as a result, it becomes impossible to project and retract the pins from and into the tire. Further, the heat is transmitted to the mechanism for moving the spike pins through each of the bottom portions of flanges of the spike pins, so that the mechanism per se becomes inoperable.

Moreover, since the tire portions each adjacent to holes which allow the spike pins to pass therethrough are subjected to heavy shearing force, so that the portions may be damaged by the shearing force. In order to sustain the shearing force and to obtain sufficient mechanical strength, proposed is the reinforcement of each of the holes. However, such reinforcement may lead to complicated production process, and resultant tire becomes heavy, which is not available for practicality. Even if the reinforcement is made, movement of the spike pins in radial direction of the tire becomes impossible, when the spike pin is slightly deformed due to heavy shearing force and strong impacting force against the road surface in projecting out state of the pins.

Another type of spike pin projection structure is proposed wherein each one of the pins is subjected to projection and retraction among a plurality of pins. According to this structure, complicated fluid paths (fluid pressure circuit) is required in the tire, and therefore, actual practicality would be dubious.

According to still another type, flange bottom portions of the respective spike pins are directly or indirectly communicates with bores of the pressure circuit which drives the pins for their radial movement relative to the tire. However, if strong shearing force and impact force is applied from the road surface to one of the spike pins, pressure leakage may occur at the one of the pins, so that resultant device becomes inoperable.

According to the publication Nos. 50-83902 and 53-133801, each of the spike pins is provided with mechanically projecting-out mechanism. However, the mechanism is complicated, and it would be difficult to put it into actual practice.

According to the publication No. 53-104908, mechanism for projecting and retracting the spike pins extends through a carcass and breaker portions of the tire. Therefore, there is technical problems in terms of sealability and mechanical strength at these portions. Further, tire strength per se may be lowered. More specifically, mechanical strength and pressure resistivity of the tire is generally obtained by the carcass and breaker portions. However, a plurality of bores are formed for the projecting-out mechanism at the very important portions according to the publication. Therefore, water proof efficiency and fluid tightness may be lowered, and tire strenth itself is degraded due to the formation of the bore at the carcass and the breaker. Such tire is not available for actual use.

Despite the fact that these device are used in cold season, there are no countermeasure against use in the cold season. For this, if the ambient temperature becomes less than the freezing point, moisture in air confined in the device may be frozen, to thereby render the device inoperable.

SUMMARY OF THE INVENTION

It is therefore, an object of the present invention to overcome the above-described prior art drawbacks and disadvantages and to provide an improved anti-skid device mounted to an automobile tire.

Another object of the present invention is to provide such device which control projection and retraction of spike members in accordance with the road condition.

Still another object of the present invention is to provide such device capable of eliminating public pollution such as particle ladden atmosphere.

Still another object of the present invention is to provide such device having simple construction with reduced number of mechanical parts or segments.

Still another object of the present invention is to provide an automobile tire having light weight and high mechanical strength with high productivity.

Still another object of the invention is to provide such device having excellent water proof and dust proof characteristic, and heat resistivity.

Still another object of the invention is to provide such device having sufficient strength against shearing force applied to the spike members from the road surface, and having sufficient braking and road traction characteristics.

These and other objects of the present invention will be attained by providing an expandable member onto a tread portion of a tire. In the expandable member, anti-skid members such as spike pins and chains are implanted at the tread peripheral portion (radially outward portion). Further, fluid passage which allows compressed fluid to pass therethrough is formed in the expandable member at radially inner portion thereof. A compressed fluid supplying mechanism is connected to the fluid passage. By the introduction of the compressed fluid into the fluid passage in response to actuation of the mechanism, the expandable member expands radially outwardly to project the anti-skid members out of the tread, and by discharging the compressed fluid from the fluid passage in response to the actuation of the mechanism, the expandable member shrinks radially inwardly to retract the anti-skid members.

The expandable member which embeds therein the anti-skid members is in the form of various pattern strip, and the expandable strip member is mounted on a tread surface of the tire. The fluid passage is connected to a fluid supply tube to which a fluid cylinder or bomb is connected. The fluid is preferably air. The mechanism for supplying compressed fluid into the fluid passage in the expandable strip member is all positioned in the vehicle body. Alternatively, a small part of the mechanism is positioned at the vehicle body, and remaining part thereof is positioned at the wheel. Operation for projecting and retracting the anti-skid members is carried out in the vehicle compartment, i.e., a vehicle driver can perform the operation when he is at the driver's seat. Alternatively, a portable cylinder is directly connected to an air inlet opening of a wheel.

Upon introduction of the compressed fluid, expandable member having elasticity is expanded, so that all anti-skid members project radially outwardly from the tread surface. Therefore, it is unnecessary to independently project each one of the anti-skid members, to thus provide simplified construction. Further, in the present invention, anti-skid members are embedded into the expandable member, so that waterproof and rustproof structure results, and mechanically stabilized construction is attainable yet performing sufficient mechanical strength against shearing force applied to the anti-skid members from the road surface.

DETAILED DESCRIPTION OF THE PREFERRED EMBODIMENTS

Figure 1:
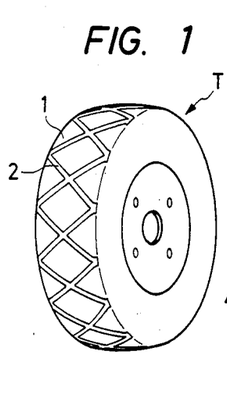
FIG. 1 is a perspective view showing anti-skid device according to the present invention.
Figure 2:
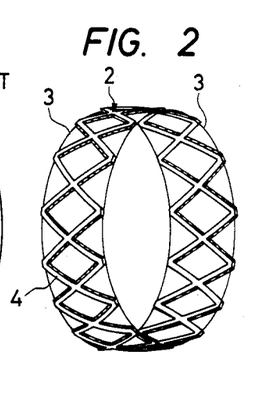
FIG. 2 is a perspective view showing an expandable member which embeds therein anti-skid members according to the present invention.
Figure 3:
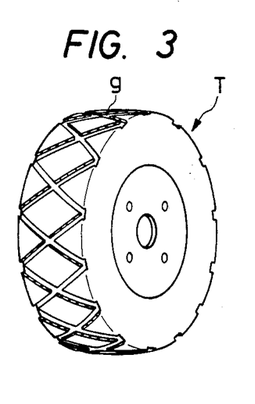
FIG. 3 is a perspective view showing a tire formed with grooves for receiving therein the expandable member.

Various embodiments according to the present invention will be described with reference to accompanying drawings. As shown in FIGS. 1 and 3, a pneumatic tire T has a tread 1 whose outer peripheral surface is formed with rhombic pattern grooves "g" with which an expandable member (spike pin embedding member) 2 is fitted. A plurality of spike pins which are anti-skid members are implanted into the expandable member 2. As shown in FIG. 2, the spike pin embedding member 2 is in the form of ring shape. The member 2 is provided by the combination of strip members 4 formed of curable rubber or reinforced rubber in which the rubber is strengthened by nylon, rayon, alpha fiber, fabric, wire, etc.. Axial end portion of the embedding member is provided with retaining wires 3,3 having circular shape.

Figure 4:
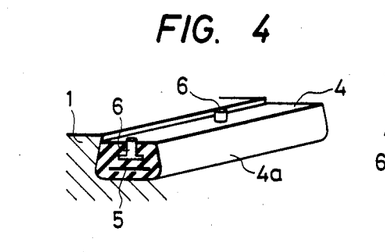
FIG. 4 i s aperspective view showing the anti-skid device in strip configuration.
Figure 5:
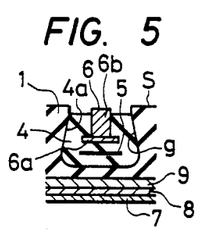
FIG. 5 is a cross-sectional view showing the anti-skid device and a part of the tread portion of a tire.

The spike pin embedding member 2 is fitted with the rhombic groove g formed at the tread portion of the tire T as shown in FIG. 3. The strip member 4 of the spike embedding member 2 is formed with pressure line hole 6 at its lower portion which allows pressurized fluid (such as compressed air) to pass therethrough as shown in FIGS. 4 and 5. Above the hole 5, spike pins 6 are embedded in the strip member 4 at predetermined intervals from each other. That is, the hole 5 is positioned in the radially inner portion of the strip member and the spike members are positioned in the radially outer portion thereof with respect to the tire. Each of the spike pins 6 has a flange portion 6a and a protrusion 6b. During non-service period, tip end of the protrusion 6b is slightly retracted from the road contacting surface S of the tread 1. That is, the tip end is positioned radially inwardly with respect to the tread surface S in this period.

As shown in FIGS. 4 and 5, the strip member 4 has inclined side walls 4a, so that width of the radially inner face of the strip is larger than that of the radially outer face. Therefore, the strip member 4 is fixedly embedded or fitted with the rhombic groove g. The tread 1 is formed over a linear 7, carcass 8 and a breaker 9 those being components of an ordinary tire.

Figure 6:
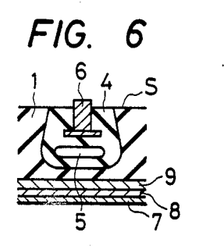
FIG. 6 is a cross-sectional view showing an expanding state of the anti-skid device.

During service period, as shown in FIG. 6, compressed air is supplied into the pressure line hole 5 of the strip member 4 for expanding the strip member 4, so that the radially outer surface of the strip 4 is approximately flush with the road contact surface S of the tread 1, and the tip end of the spike pin 6 radially outwardly projects out of the tread surface S. If the compressed air is discharged from the pressure line hole 5, the strip member 4 restores its original shape shown in FIG. 5 because of its elasticity.

When the spike pin 6 is at projecting state, the strip member 4 is further urged toward the groove g because of the expansion of the strip member 4. Therefore, the strip member 4 can withstand heavy shearing force and bending moment applied thereto. On the other hand, when the spike pin 6 is at retracted state, the strip member 4 is smoothly retracted into the groove g because of elasticity of the strip member and pressure application from road surface to the tread as well as tensile force of the retaining wire 3. This return back movement of the strip member along the groove wall is promoted by the tapered configuration of the side walls of the strip member. Upon retraction of the strip member 4, it is retained stably in the groove g.

Figure 7:
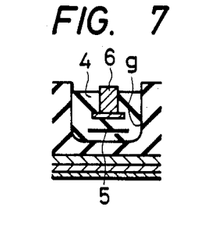
FIG. 7 is a cross-sectional view showing an anti-skid device according to another embodiment of the present invention.

FIG. 7 shows a groove g whose side walls are directed in parallel with each other. In this case, the side walls of the strip member 4 is also directed in parallel with each other.

Figure 8:
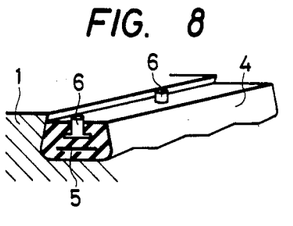
FIG. 8 is a perspective view showing an anti-skid device whose bottom surface is irregularly formed.

In FIG. 8, bottom wall of the strip member 4 i.e., radially inner face of the strip 4 and a groove bottom confronting the inner face are formed in zig-zag manner. With this construction, displacement of the strip member in its lengthwise direction can be prevented, so that the member 4 can be stabilizingly accomodated in the groove g.

Figure 9:
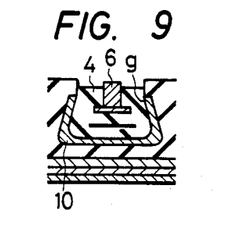
FIG. 9 is a cross-sectional view showing an anti-skid device wherein a reinforcing guide member is further provided.

Further, in an embodiment shown in FIG. 9, a rigid guide plate 10 is provided integral with the groove g. The guide plate 10 is formed of a material more rigid than the material of the strip member 4. By disposing or fitting the strip member 4 in the guide plate 10, radially inward deformation of the strip member 4 can be eliminated, but the strip member 4 surely expands radially outwardly upon application of compressed fluid into the hole 5, whereby the spike pin 6 is surely urged radially outwardly.

Figure 10:
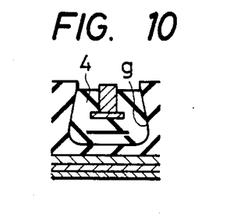
FIGS. 10 through 12 are cross-sectional views showing anti-skid device according to still other embodiments of the present invention.
Figure 11:
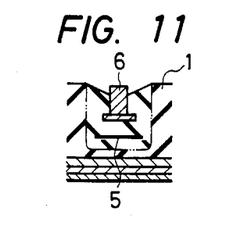

In an embodiment shown in FIG. 10, bottom face of the strip member 4 is adhered to the bottom of the groove g by adhesive agent, and in an embodiment shown in FIG. 11, the strip member 4 is fuse-bonded with the tread portion 1 during molding of the member 4 to provide an integral construction.

Figure 12:
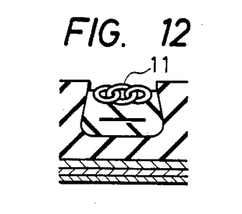

In an embodiment shown in FIG. 12, chain 11 can be embedded into the strip member 4 instead of the spike pins 6. Further, in an embodiment shown in FIG. 13, a plurality of rigid projections 15 can be integrally provided onto the strip member 4.

Figures 13, 14, 15:
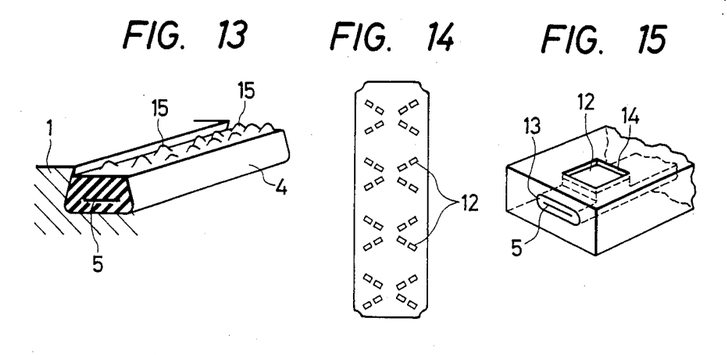
FIG. 13 is a perspective view showing still another embodiment of the present invention.
FIG. 14 is a top view showing spike pin embedding member (expandable member) according to still another embodiment of the present invention.
FIG. 15 is a perspective view of the spike pin embedding member shown in FIG. 14.

In the spike pin embedding member 2 shown in FIG. 1, the strip members 4 are arranged in continuous rhombic pattern at the tread 1. However, according to an embodiment shown in FIG. 14, the spike pin embedding members 12 are partly exposed. In the latter case, a plurality of spike pin embedding portions 12 spaced away from each other are disposed on a depressed strip member 13, and a tread 1 is formed with recesses 14 with which the embedding portions 12 are accomodated as shown in FIG. 15.

Figure 16:
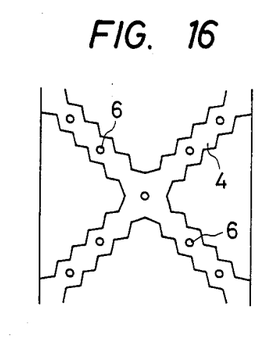
FIGS. 16–23 show various patterns of spike pin embedding members.
Figure 17:
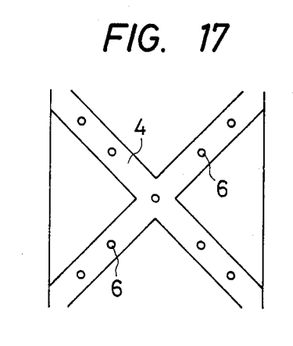
Figure 18:
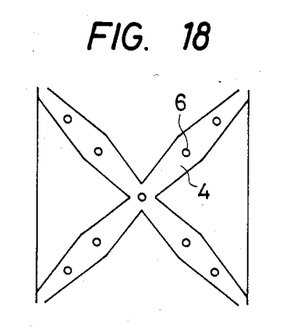
Figure 19:
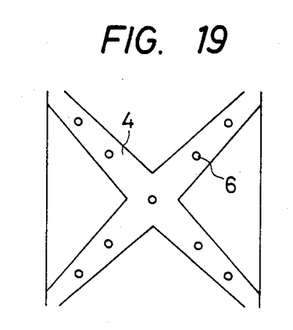

The strip 4 has various shape in plan view. For example, as shown in FIG. 16, longitudinal side edgelines of the strip 4 is formed in zig-zag manner, or as shown in FIG. 17, the side edgelines extend linearly so as to have uniform lateral width along its length. Further, the side edgelines are changed so as to change lateral width of the strip member 4 along its length as show in FIGS. 18 and 19.

Figure 20:
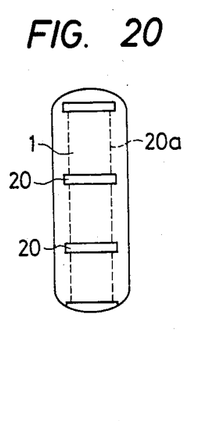
Figure 21:
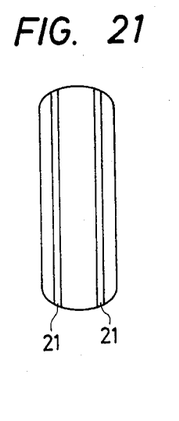
Figure 22:
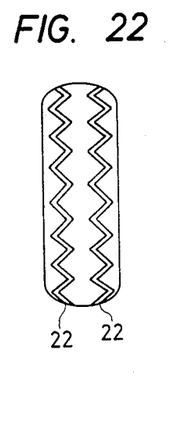
Figure 23:
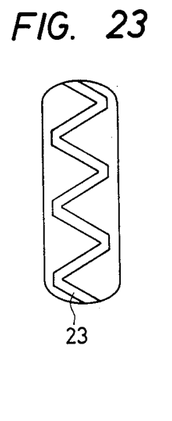

FIGS. 20–23 show another patterns of the members embedding spike pins disposed on the tire tread 1. In FIG. 20, each of the strips 20 are spaced away by equidistance and extends in axial direction of the tire. The strips 20 are connected together by connection members 20a embedded in the tread portion. In FIG. 21, two strip members 1 are provided in parallelism on the tread portion and directed in circumferential direction of the tire. In FIG. 22, two strip members 22 each having zig-zag configuration are directed in parallelism in circumferential direction of the tire. Further in FIG. 23, a single strip member 23 having zig-zag configuration is formed on the tread portion of the tire.

Figure 24:
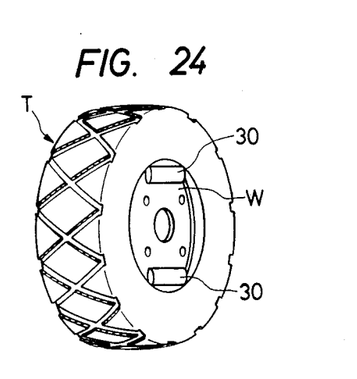
FIG. 24 is a perspective view showing an anti-skid device provided with a fluid cylinder.
Figure 25:
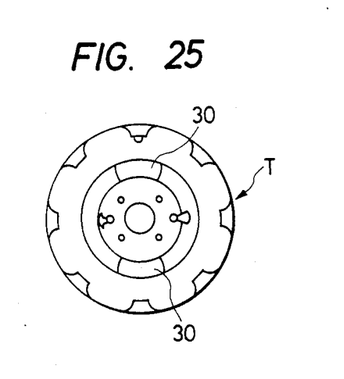
FIG. 25 is a front view showing an anti-skid device provided with arcuate fluid cylinders.
Figure 26:
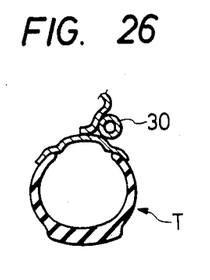
FIG. 26 is a cross-sectional view of a tire showing a position of the cylinder.
Figure 27:
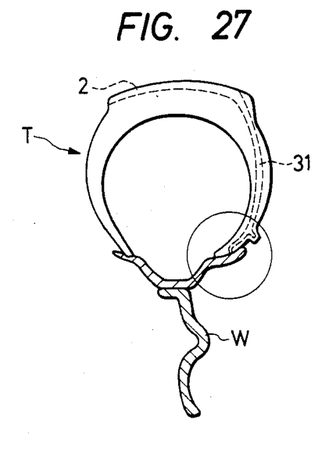
FIG. 27 shows an air supply tube connected to a spike pin embedding member.
Figure 28:
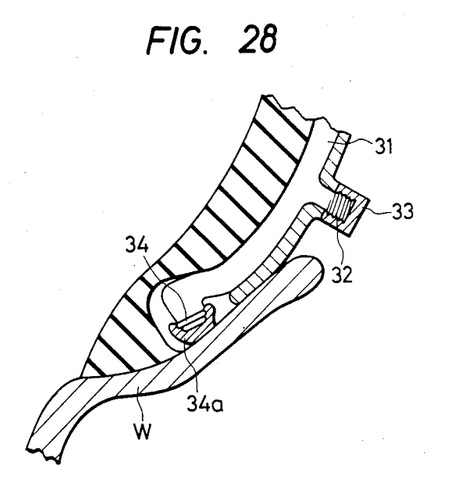
FIG. 28 is an enlarged view showing a circular portion of FIG. 27.
Figure 29:
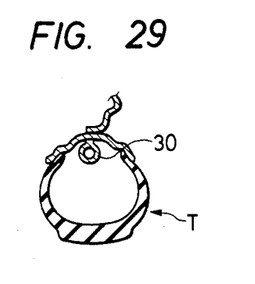
FIG. 29 is a cross-sectional view of a tire showing a position of a fluid cylinder modified with respect to the embodiment shown in FIG. 26.

Next, described will be a mechanism for supplying compressed air into the spike pin embedding member 2. As shown in FIGS. 24 and 25, two pneumatic cylinders 30 and 30 are disposed symmetrically with respect to a rotation axis of a tire T to a wheel portion W. Compressed air in the cylinders 30 is supplied, through an air pipe (not shown), to a supply tube 31 shown in FIGS. 27 and 28 connected to the spike pin embedding member 2 and extending along the side face of the tire T. In the embodiments shown in FIGS. 27 and 28, a portable pneumatic cylinder is manually attached to a valve 32 projecting from the supply tube 31, so that the air is supplied into the interior of the spike pin embedding member 2. If such cylinders are not manually attached to the wheel portion W, but a compressed air supplying mechanism is intended to be installed to a vehicle body, the valve 32 is covered with a cover member 33, and a quick-connect valve 34 provided at distal end portion of the supply pipe 31 is used. That is, the valve 34 is normally engaged with and fixed to a blind lid 34a disposed at internal portion of the wheel W. However, when the compressed air supplying mechanism on the vehicle body side is used the valve 34 is pulled out of the blind lid 34a, and is connected to an air pipe (not shown) connected to a pneumatic means.

Incidentally, the cylinder 30 can has arcuate shape as shown in FIG. 25. Further, the cylinder 30 can be accomodated in the tire interior.

Figure 30:
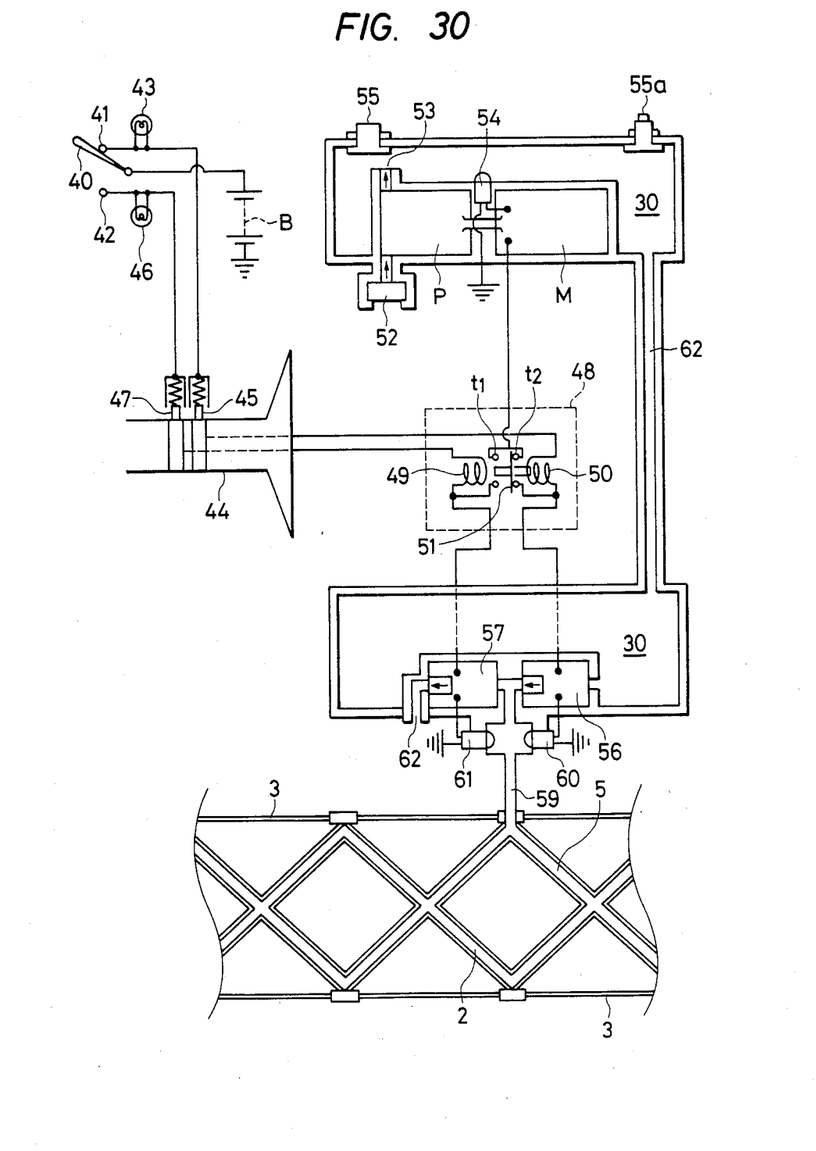
FIGS. 30 and 31 are diagrams showing fluid circuits for supplying compressed air into the spike pin embedding member.

Switching operation of the cylinder 30 is carried out by an operator at his driver's seat, and compressed fluid supplying system is shown in FIG. 30. At a front dashboard, an operation switch 40 is provided which is connected to a storage battery B. The switch 40 is tiltable between operation(OPR) side and release(REL) side. The OPR side terminal 41 is connected to an electrically conductive ring 45 disposed on a wheel axle 44 through an operation lamp 43, whereas a REL side terminal 42 is connected to an electrically conductive ring 47 through an operation lamp 46. These electrically conductive rings 45 and 47 are connected to a circuit transducer 48. The transducer 48 includes a pair of coils 49 and 50 confronting with each other, and a toggle type electrically conductive piece 51 is disposed between the coils. The piece 51 is displaceable between terminals t1 and t2. When the electrically conductive piece 51 is in contact with one of the terminals t1 and t2, a motor M connected to one of the cylinders 30 is actuated, so that a compression pump P is energized. By the energization of the pump P, atmospheric air is intaken through a filter 52 thereinto, and the air is compressed. The compressed air is then introduced into the cylinder 30 through a compressed air inlet 53. A pressure sensitive switch 54 is provided in the cylinder 30 so as to control actuation of the motor M. Further, in the cylinder 30, a release valve 55 and a auxiliary valve 50a are provided. The release valve 55 is adapted to discharge air when the air pressure in the cylinder 30 exceeds predetermined level, and the auxiliary valve 30a is adapted to directly supply compressed air into the cylinder 30 at malfunction.

The coil 50 in the circuit transducer 48 is connected to an air supplying solenoid valve 56 connected to the other cylinder 30, and the coil 49 is connected to an air discharging solenoid valve 57 connected to the other cylinder 30. These solenoid valves 56 and 57 are connected to pressure switches 60, 61, respectively which confront an interior of an air supplying tube 59. These valves 56 and 57 are opened or closed in response to the switches. The air supplying tube 59 is connected to the pressure line hole 5 described above in a spike pin embedding member. The cylinders 30 and 30 are connected together by a pipe 62.

Next, operation mode of the system shown in FIG. 30 will be described. When the switch 40 is shifted to OPR side terminal 41, the lamp 43 is subjected to lighting, and electrical current is applied to the coil 50 of the transducer 48 from the battery B. The coil is subjected to excitation to urge the piece 51 toward the terminal t2, so that the piece 51 is brought into contact therewith. Therefore, the solenoid valve 56 is actuated for introducing compressed air into the spike pin embedding member 2.

When the pneumatic pressure within the pressure line hole 5 in the embedding member 2 reaches to a predetermined pressure such as, for example, about not less than 5.0 plus or minus 0.5 kg per square centimeters, the pressure switch 60 detects the overpressure to deenergize the soleoid valve 56. Simultaneously, the lamp 43 is cut off.

Further, in the above operation, if the pressure in the cylinder 30 becomes less than a predetermined level such as, for example, about from 11 plus or minus 1 kg per square centimeters to 14 plus or minus 1 kg per square centimeters, the pressure switch 54 detects the decreased pressure for actuating the motor M, so that compressed air is supplied into the cylinder 30. Furthermore, regardless of rightward or leftward position of the electrically conductive piece 51, the piece 51 can be restored to its original position because of its toggle type arrangement. Therefore, if the inner pressure of the cylinder 30 becomes less than the predetermined level, the motor M is energized for maintaining the internal pressure of the cylinder 30 at the constant pressure.

The above-described operation concerns radially outward projecting movement of the spike pins. if the spike pin is required to be retracted within the tread, the switch 40is tilted toward REL side terminal 42. In this case, the operation lamp 46 is subjected to lighting, and concurrently, the coil 49 is excited to shift the piece 51 toward the terminal t1. At this time, the solenoid valve 57 is actuated, so that air in the embedding member 2 is discharged toward atmosphere through an outlet 62.

When the inner pressure in the pressure line hole 5 becomes less than a predetermined level such as, for example, about 1.1 plus minus 0.1 kg per square centimeters, the pressure switch 61 is turned OFF to close the valve 57. As a result, air discharge is terminated and the operation lamp 46 is cut off.

The air supply system shown in FIG. 30 provides the cylinder at the wheel, and the actuation of the cylinder is controlled at the driver's seat. However, in order to further ensure the cylinder operation in an attempt to eliminate operational error of the valves due to centrifugal force of the wheel, each of the mechanical segments can be installed on the vehicle body side as shown in FIG. 31.

Figure 31:
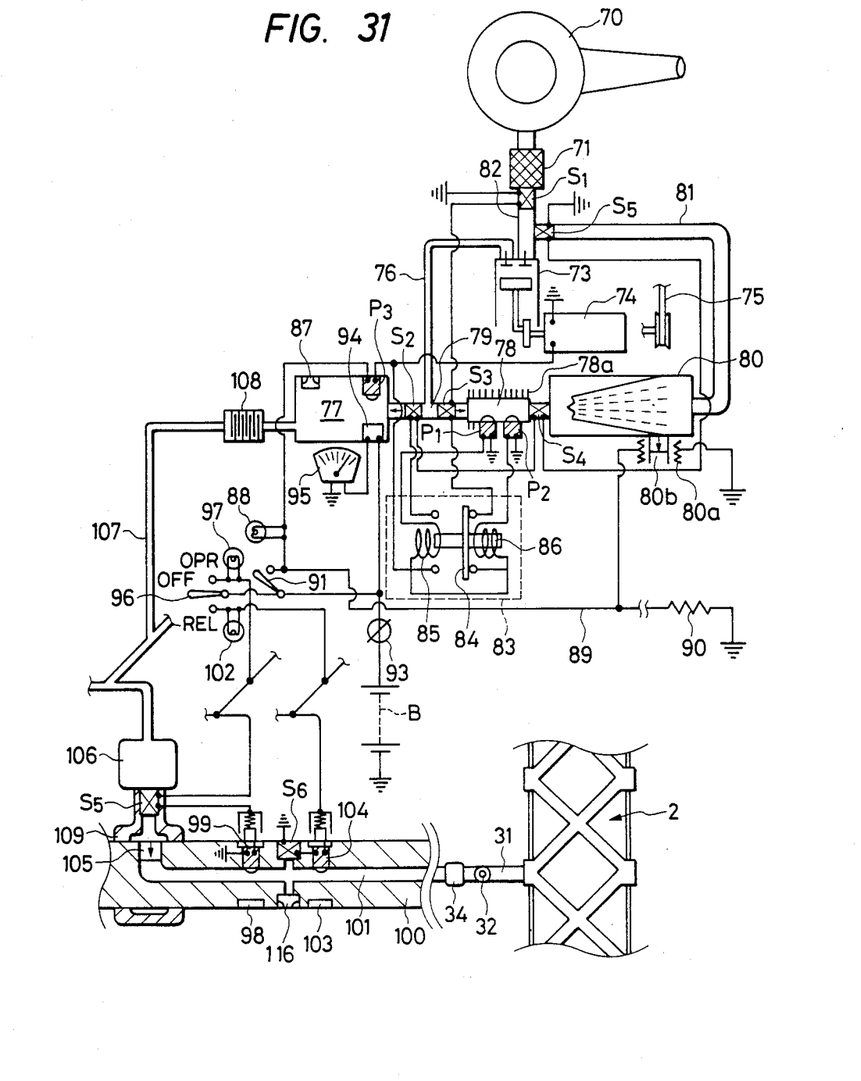

According to a compressed fluid supplying system shown in FIG. 31, an air cleaner 70 is connected to a pump 73 through a solenoid valve S1 and an air filter 71 in which activated charcoal is accomodated. The pump 73 is actuated by an electric motor 74. The motor 74 can be driven by an engine (not shown) through a pulley 75 provided with an electrical clutch (not shown).

The pump 73 is connected to one end of a pipe 76 whose other end is connected to a pipe 79 connecting between a main cylinder 77 and a small tank 78 around which heat radiating fins 78a are provided. Both ends of the pipe 79 are provided with solenoid valves S2 and S3. The small tank is connected, through a solenoid valve S4, to a water separator 80 provided with a heater 80a and a check valve 80b. The water separator 80 serves to remove water from air. A pipe 81 extending from the separator 80 is connected, through a solenoid valve S5, to a pipe 82 extending from the cleaner 70.

Within the small tank 78, two pressure switches P1 and P2 are disposed. These switches are operably connected to a circuit transducer 83 whose structure is substantially the same as the transducer 48 used in the embodiment shown in FIG. 30, and which includes toggle type electrically conductive piece 84 and a pair of coils 85 and 86.

The main cylinder 77 is provided with a relief valve 87 and a pressure switch P3 which is connected to the electric motor 74 as well as to a heater wire 89 by way of a monitor lamp 88. The heater wire 89 is connected to a heater 90 adapted to heat a requisite portion of this system.

Electric current from the battery B is supplied into the pressure switch P3 and the heater wire 89 through a master switch 93 upon operation of a switch 91. Further, when the master switch 93 is turned ON, the battery current is supplied to a pressure transmission means 94 in the main cylinder 77. The transmission means 94 is connected to a pressure indicator 95.

An operation switch 96 is disposed in the vicinity of the switch 91. The operation switch 96 is tiltable between the OPR and REL side terminals. The OPR side terminal is connected to a solenoid valve S5 through an operation lamp 97 and is also connected to an electrically conductive ring 98 an a pressure switch 99. The pressure switch 99 is situated on a pressure line 101 formed in a wheel axle 100. The REL side terminal is connected to an electrically conductive ring 103 through an operation lamp 102. The REL side terminal is also connected to a pressure switch 104 whose output signal actuates a solenoid valve S6 for discharrging air in the pressure line 101 to the atmosphere. The pressure line 101 is provided with a relief valve 116 so as to discharge air to the atmosphere when the fluid pressure in the pressure line and in the spike embedding member 2 exceeds a predetermined level. The pressure line 101 is connected to an air supply pipe 31 through the quick-connect-valve 34 typically shown in FIG. 28. The air supply pipe 31 is provided with a valve 32 connectable to a portable cylinder. At an upstream end of the pressure line 101 in the wheel axle 100, there is provided a check valve 105 and at an upstream side of the check valve 105, an accumulation tank 106 is disposed which is connected to the main cylinder 77 through a tube 107 provided with an activated charcoal chamber 108.

Between the solenoid valve S5 and the check valve 105 a sealing member 109 is provided which is in sliding contact with an outer peripheral surface of the wheel axle 100. Because of the provision of the accumuation tank 106, the compressed air at the sealing member 109 is smoothly introduced into the pressure line 101 of the wheel axle. More specifically, the main cylinder 77 is positioned away from the sealing member 109 and the main cylinder 77 is connected thereto by the pipe 107 having relatively small diameter. Therefore, when the compressed air is supplied through the small diameter pipe 107, the compressed air does not smoothly pass therethrough due to flow resistance. As a result, air leakage may occur at the sealing member 109. (The leakage rate would be high relative to the flow amount to generate pressure loss.) In order to obviate this problem, the accumulation tank 106 is positioned adjacent the sealing member 109, so that highly pressurized air in the tank 106 is readily introduced into the upstream end of the pressure line 101 upon actuation of the solenoid valve S5, to thus provide effective pressure supply without any substantial pressure loss.

Figure 32:
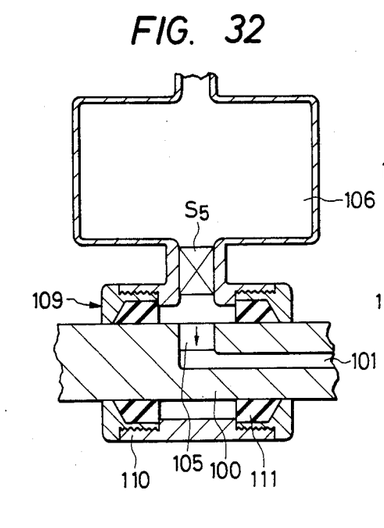
FIGS. 32 and 33 are explanatory diagrams showing sealing mechanism for supplying compressed air into a pressure line in a wheel axle.
Figure 33:
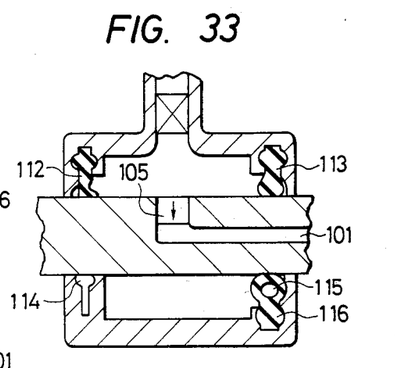

Detailed construction of the sealing member 109 is shown in FIGS. 32 and 33. In an embodiment shown in FIG. 32, the sealing member includes a sleeve portion 110 and annular rings 111 formed of elastic material such as rubber disposed at both axial ends of the sleeve portion 110. Alternatively, as shown in FIG. 33, various elastic members 112 and 113 having different configuration from each other are disposed for shaft sealing. Further, other shaft seal arrangement is concievable. For example, as shown in FIG. 33, the sealing member 109 is formed with an annular groove 114 through which pressurized fluid is supplied to provide fluid pressure sealing. Alternatively, an annular elastic ring 116 is disposed over the axle 100, and the ring 116 is formed with a bore 115 through which pressurized fluid from the main cylinder 77 is introduced to elastically deform the ring 116 for shaft sealing.

Figure 34:
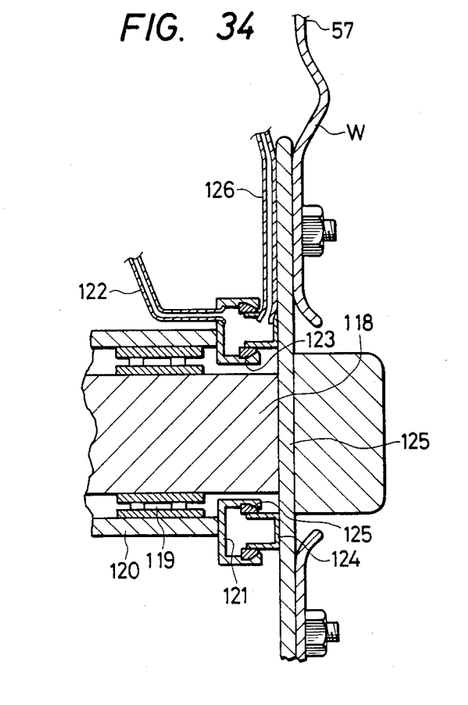
FIG. 34 is a cross-sectional view showing end portion of wheel axle incorporating a mechanism for supplying compressed air into the spike pin embedding member according to still another embodiment of the present invention; and, FIGS. 35 and 36 are diagrams showing compressed air supplying system to supply the air into the spike pin embedding member according to still another embodiments of the present invention.

According to a modified embodiment shown in FIG. 34, the above-mentioned pressure line is not formed in the wheel axle. In this embodiment, a wheel axle 118 is rotatably supported, through a bearing 119, by a stationary support frame 120 extending from a vehicle body, and an annular air chamber 121 is fixedly secured to the axial end of the support frame 120. A pipe member 122 extending from the accumulation tank is connected to the air chamber 121. The air chamber 121 is engaged, through elastic rubber members 123, with a ring member 124 fixedly secured to a wheel disk plate 125 to which a wheel W is fixed. One end of an air supply pipe 126 is connected to the ring member 124, and the other end of the pipe 126 is connected to the spike pin embedding member 2.

Operation mode according to the compressed air supply system shown in FIG. 31 will be described.

When the master switch 93 is turned ON, pressure level in the main cylinder 77 is indicated by the pressure indicator 95 in response to an output signal sent from the pressure transmission means 94 in the main cylinder 77.

When the switch 91 is turned ON for initiating operation of the system, and if the pressure in the main cylinder 77 is lower than the predetermined level, electric current is flowed in an electrical circuit since the pressure switch P3 is closed (the switch P3 is in an ON state when the pressure is not more than 26 plus or minus 1 kg per square centimeters, and the switch P 3 is in an OFF state when the pressure is not less than 31 plus or minus 1 kg per square centimeters). As a result, the electric motor 74 is energized to start operation of the pump 73 simultaneous with lighting of the monitor lamp 88. Incidentally, the motor 74 can be driven by the engine-driven pulley 75 by the actuation of the electrical clutch in response to an output signal from the pressure switch P3.

Described will be the radially outward projecting movement of the spike pins from the radially innermost- (most retracted) positions thereof. (In this case, no substantial fluid pressure is applied to the pressure line in the spike pin embedding member 2, and the pressure switch 99 is short-circuited.) When the operation switch 96 is turned to the OPR side terminal, electrical current from the battery B flows into the ground (vehicle body) through the solenoid valve S5, the electrically conductive ring 98 and the pressure switch 99. For this, the solenoid valve S5 is actuated to allow compressed air to supply into the pressure line. (in this case, the operation lamp 97 is subjected to lighting.) When the pressure level becomes not less than 5.5 plus or minus 0.5 kg per square centimeters, the pressure switch 99 is turned OFF to close the solenoid valve S5. (in this case, the operation lamp is cut off, and pressure switch 104 is short-circuited.)

Next, in order to radially inwardly retract the spike pins from their radially outermost positions, when the operation switch 96 is tilted toward REL side terminal, the electric current from the battery B flows into the ground through the operation switch 96, the electrically conductive ring 103, the pressure switch 104 and the solenoid valve S6. (in this case, the operation lamp 102 is subjected to lighting.) For this, the solenoid valve S6 is opened to allow compressed air in the pressure line of the embedding member to be discharged toward atmosphere. When the internal pressure of the pressure line becomes not more than 1.1 plus or minus 0.1 kg per square centimeters, the pressure switch 104 is turned OFF to cut off the electrical current, and accordingly, the solenoid valve S6 is closed and operation lamp 102 is cut off.

Air is intaken from the air cleaner 70 and is introduced, through the air filter, into the pump 73 at which the air is subjected to compression, and the compressed air is accumuated in the main cylinder 77. The air is subjected to water removal at the water separator 80 before the air reaches to the main cylinder 77. That is, the air is subjected to adiabatic change (expansion) for condensing water vapor in the air, and the generated water drop is removed by the separator 80, so that dry air is supplied to the main cylinder 77.

To be more specific, when the internal pressure in the main cylinder 77 is less than 26 plus minus 1 kg per square centimeters, the pressure switch P3 turns ON to provide a closed electrical circuit, so that the electric motor 74 is energized to operate the pump 73. Provided that the toggle type electrically conductive piece 84 of the circuit transducer 83 is biased in contact with the right side terminal in FIG. 31, electrical current flows through the solenoid valves S3 and S1, so that these valves are opened, to thereby accumulate compressed air in the small tank 78. If the pneumatic pressure in the small tank 78 becomes not less than 6 plus or minus 1 kg per square centimeters, the pressure switch P1 turns ON for flowing electrical current through the coil 85 (high pressure side coil), so that the toggle type piece 84 is urged leftwardly. As a result, electrical current through the solenoids S3 and S1 is cut off, to thereby close these valves. Simultaneously, solenoid valves S2, S4 and S5 are opened upon flowing electrical current therethrough, so that the compressed air in the small tank 78 is promptly flowed into the water separator 80, during which the compressed air is subjected to adiabatic expansion for condensing water vapor in the air. Thus generated water droplet passes through the water separator 80 along the compressed air stream. In the water separator 80, the water is separated from the compressed air by, for example, application of centrifugal force. Then the compressed air without water content is directed to the solenoid valve S5, and is compressed by the pump 73, and the air is introduced into the main cylinder 77. With this state maintained, if the pump 73 is further operated, inner pressure of the water separator 80 and the small tank 78 is lowered to not more than 0.8 plus minus 0.1 kg per square centimeters, and the pressure switch P2 turns ON. By the switch P2 turning ON, electrical current flows through the coil 86 (low pressure side coil) to urge the toggle type piece 84 rightwarly. Therefore, electrical current flows through the solenoid valves S3 and S1 into the ground, to thereby open these valves. For this, compressed air is accumuated in the small tank 78, and solenoid valves S2, S4, S5 are closed due to cut-off the electrical current.

Water thus separated is accumulated at the lower portion of the water separator, since water is much heavier than air. The above-described operations are repeatedly carried out. When the compressed air is discharged from the small tank 78 into the separator, the internal pressure of the water separator 80 is temporalily higher than the atmospheric pressure. As a result, the check valve 80b provided at the lower portion of the separator 80 is opened to allow part of the air to be discharged to the atmosphere. In this partial air discharge, water in th separator is also discharged.

The check valve 80b as well as main components of the water separator 80 are heated by the heater 80a for preventing these from freezing to ensure stabilized operation thereof.

In view of the foregoing, according to the system shown in FIG. 31, dry air can be employed. The dry air is provided by adiabatic expansion of the air prior to the air being supplied into the pressure line, and the water is separated from the air, and the dry air is again compressed by the pump and is supplied into the main cylinder. Therefore, resultant system can avoid freezing and rust generation in the various mechanical parts. Rustproof characterisitic is further enhanced, if the mechanical components are formed of rust-resistive materials, and/or water accumulation chamber is provided in a suitable portion so as to prevent water from being entered into critical portion even if water is entered into the pressure line. Furthermore, employment of activated charcoal and heat application to the essential portions are also effective to minimize break down of the entire system.

Figure 35:
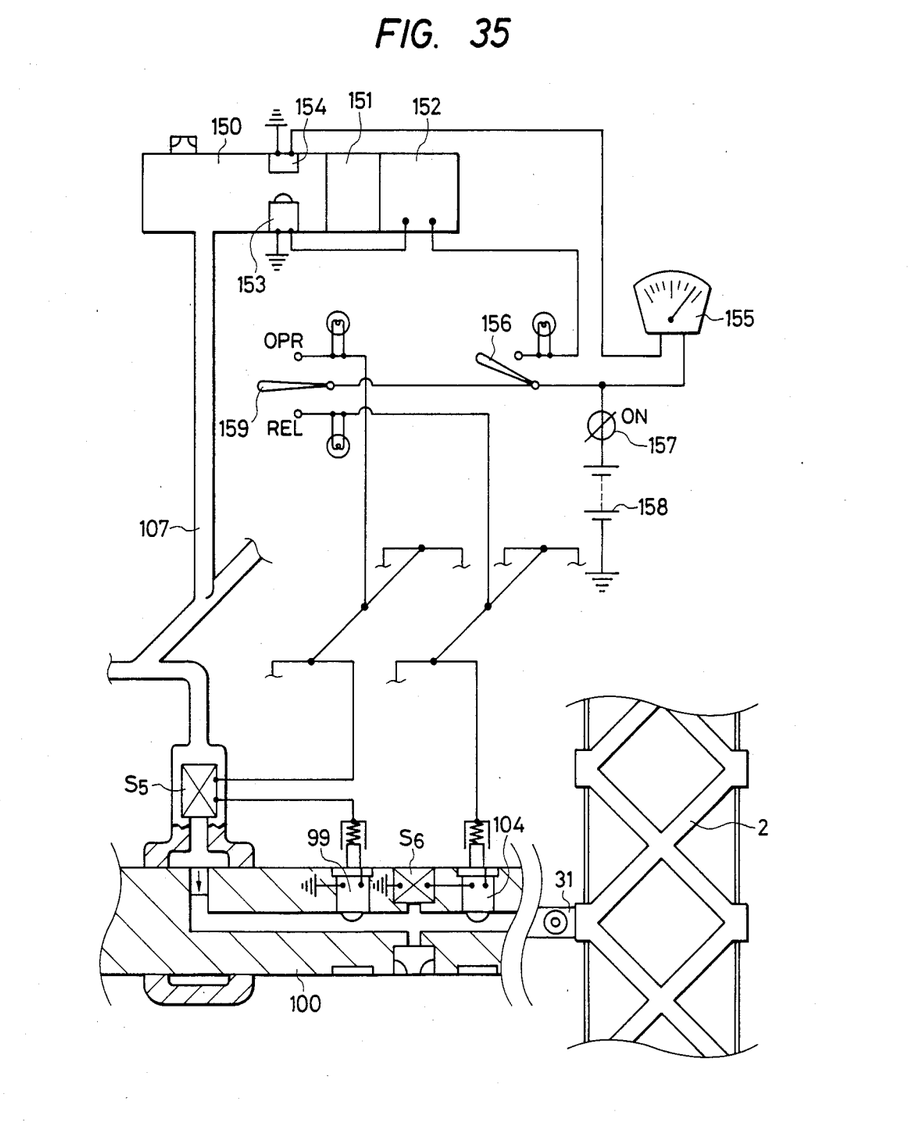
Figure 36:
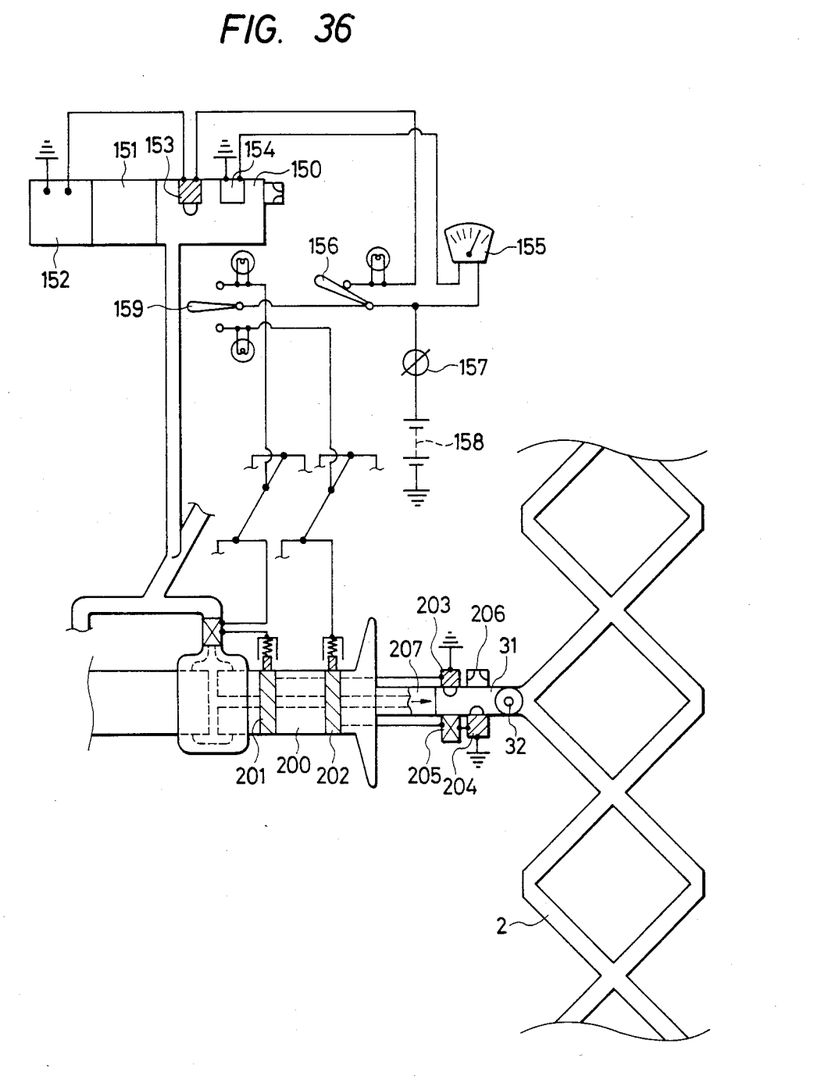

FIGS. 35 and 36 are other embodiments showing simplified air supplying systems, wherein the air cleaner, the water separator nor the small tank are not provided. In the embodiment shown in FIG. 35, a compressed air is accumulated in a cylinder 150 by a pump 151 and a motor 152. Internal pressure in the cylinder 150 is detected by a pressure switch 153, and the pressure level is indicated by a pressure indicator 155 by way of a pressure transmission means 154. The motor 152 becomes operable by turning ON a cylinder actuation switch 156 which is connected to a battery 158 through a master switch 157. The cylinder actuation switch 156 is provided with an operation switch 159 which is tiltable between OPR and REL side terminals. With respect to the remaining components in the embodiment shown in FIG. 35, like parts and components are designated by the same reference numerals and characters as those shown in FIG. 31. Maintaining the cylinder actuation switch 156 in ON state, the pressure switch 153 is actuated to supply compressed air into the cylinder 150 if the pressure in the cylinder 150 is lowered, and the motor 152 is deenergized to terminate air supply into the cylinder if the cylinder pressure is increased. The operation of the operation switch 159 is the same as that of the switch in the embodiment shown in FIG. 31. Compressed air is introduced into or discharged from the embedding member 2 in response to the operation of the operation switch 159.

An embodiment shown in FIG. 36 would be similar to that shown in FIG. 35. In FIG. 36, electrically conductive rings 201 and 202 are disposed to a wheel axle 200, and pressure switches 203 204, a solenoid valve 205, a release valve 206 and a check valve 207 are provided in the air supply pipe 31. Functions attendant to these components are the same as those shown in FIG. 31 embodiment, and remaining mechanisms are the same as those shown in FIG. 35.

The spike embedding member 2 according to the present invention can be produced independent of the tire, and the member 2 is assembled to tread grooves of the tire. By the independent productions, reinforcements or any other processing required is easily and independently effected to the tire and the embedding member 2. Further, the embedding member 2 can be mounted on a peripheral portion of an incomplete tire such as, for example, unvulcanized tire, and thereafter, the tire tread is produced by injection molding in a metal mold so as to provide the integral structure between the tread portion and the embedding member 2.

Furthermore, various combinations would be available in accordance with localities and service conditions. For example, at little snow locality, the combination of the embedding member and an ordinary tire is available, and at an area of high snowfall available is the combination of the embedding member and a snow tire which is an automotive tire with a tread designed to give added traction on snow or ice. At tremendous snowfall area and mountain area, the snow tire is combined with the spike embedding member which provides a large spike projection length. Resultant combination provides functions equivallent to the tire chains.

According to the present invention, the spike pins are directly implanted in the embedding member 2 and the embedding member is expandable. Therefore, it is unnecessary to provide specific water-proof, dust-proof and fluid-tight arrangements which have been deemed to be requred for the conventional spike pin projectable and retractable structures. Further in the present invention, even if frictional heat is generated at the spike pins due to friction relative to the road surface, the heat is provisionally transmitted to the embedding member, and thereafter is transmitted to and radiated at the tread portion. Therefore, the heat generation does not affect the projecting and retracting movement of the spike pins. Similarly, even if rust is formed at the spike pins, the rust does not affect the movement of the pins. Furthermore, even if the spike pins are subjected to deformation during running due to applications of heavy shearing force and bending moment and due to impact against road surface, the spike pins are smoothly movable. Moreover, even if one of the spike pins is released from the embedding member due to application of extraordinary shearing force or bending moment, remaining portion is maintained as it is.

According to the present invention, the embedding member is forced by a combination of continuous strip members, available is a simple mechanism for supplying compressed fluid thereinto, and all of the spike pins are simultaneously movable. With the structure, pin projecting and retracting mechanism is also simplified to thereby provide the anti-skid device having high resistivities against shearing force, bending moment and impact from the road surface. Further, pressure line for passing pressurized fluid therethrough can be also simplified, to thereby provide high productivity.

Furthermore, a mechanism for supplying the compressedair into the embedding member 2 can be manual mechanism or automatic mechanism. For example, if manual mechanism is employed, an operator stops the vehicle when he encounters slipping road surface, and the operator directly connects a small-size pump or a portable pressure cylinder to a valve portion of the embedding member so as to introduce compressed air thereinto. As a result, the spike pins project radially outwardly with respect to the wheel. This may be the rapid conversion of the snow tire into the spiked tire.

On the dry road surface, the operator stops the vehicle, and the compressed air in the embedding member is discharged from the valve, so that the tire restores its original snow tire configuration. This easy operation can avoid public pollution such as particle ladden atmospheric pollution.

As described above, the present invention can overcome the conventional drawbacks which drawbacks have not yet been solved by the conventional tire having projectable spike pins. That is, in the present invention, vehicle slippage accident is prevented which is apt to be occured mainly at winter season, and particularly at early winter, early spring, snow falling period and freezing period. The present invention also avoids any impediment caused by vehicle travel such as noise generation, dust generation due to scratching to the road surface, and damage to the road surface.

In the present invention, projection and retraction of the spike pins is controllable directly or by remote control, so that the spike pins are projectable and retractable during vehicle parking or during vehicle running. Accordingly, the present invention does not lead to public pollution such as particle ladden atmosphere. Therefore, the present invention provides excellent practical use.

The tire according to the present invention has a simple structure and reduced number of mechanical parts. Therefore, resultant tire is light in weight, and has high mechnical strength with high productivity. Further, the tire according to the present invention has excellent water-proof, dust-proof characteristics as well as excellent sealability and heat-resistivity. Furthermore, the present invention provides sufficient strength against shearing force and bending moment exerting on the spike pins, and also provides excellent vehicle braking force and traction force.

While the invention has been described with reference to specific embodiments thereof, it will be apparent for those skilled in the art that various changes and modifications can be made therein without departing from the spirit and scope of the invention.

What is claimed is:

1. An anti-skid device for preventing slippage of a wheel which includes a tire having a tread portion at its outer peripheral surface, said device comprising:

a unitary cylindricalexpandable member disposed as a separate member on the tread surface of a tire about the circumference of said tire, said expandable member having anti-skid members implanted at a radially outer portion of said expandable member, said expandable member being formed with a hole at a radially inner portion thereof extending about the circumference of the tire, said radially outer portion including means for stably holding said anti-skid members, said means for stably holding comprising a solid rubber portion in which said anti-skid members are implanted; and, compressed fluid supplying means connectable to said hole of said expandable member, said expandable member expanding upon supply of compressed fluid into said hole to project the anti-skid members out of the tread, and shrinking upon discharge of said compressed fluid from said hole to retract the anti-skid members wherein said anti-skid members are pins or chains.

2. The anti-skid device as defined in claim 1, wherein said expandable member comprises continuous strip members having elasticity.

3. The anti-skid device as defined in claim 2, wherein said continuous strip members provide rhombic pattern, and said tire is formed with grooves in a rhombic configuration at said tread portion, so that said continuous strip is fitted with said grooves.

4. The anti-skid device as defined in claim 2, further comprising a pair of circular wires, each being disposed at axial end of said cylindrical expandable member.

5. The anti-skid device as claimed in claim 1, wherein said anti-skid members project out of an outer peripheral surface of said expandable member, each of tip ends of said anti-skid members being positioned radially inwardly with respect to a surface of said tread portion during non-service state of said expandable member.

6. The anti-skid device as claimed in claim 2, wherein each of said strip members has rectangular cross-section, a width of radially outer side of said strip member being smaller than a width of radially inner side thereof.

7. The anti-skid device as claimed in claim 2, wherein each of said strip members has rectangular cross-section, a radially inner side of said strip member being irregularly formed.

8. The anti-skid device as claimed in claim 3, further comprising a rigid guide plate fixed to said groove, said guide plate being in contact with said strip member.

9. The anti-skid device as claimed in claim 3, further comprising an adhesive agent for bonding a radially inner side of said strip member to a bottom of said groove.

10. The anti-skid device as defined in claim 2, wherein said strip mnembers are fuse-bonded to said tread portion.

11. The anti-skid device as defined in claim 2, wherein a width of said strip member is changeable along its length.

12. The anti-skid device as defined in claim 2, wherein a width of said strip member is uniform along its length.

13. The anti-skid device as defined in claim 2, wherein each of said strip members is a circular shape with straight configuration on said tread portion.

14. The anti-skid device as defined in claim 2, wherein each of said strip members is a circular shape with zigzag pattern on said tread portion.

15. The anti-skid device as defined in claim 1, wherein said compressed fluid supplying means comprises at least one cylinder secured to said wheel and connectable to said hole of said expandable member, operation of said cylinder being controllable at driver's seat.

16. The anti-skid device as defined in claim 1, wherein said compressed fluid supplying means comprises at least one portable cylinder manually connectable to said hole of said expandable member.

17. The anti-skid device as defined in claim 1, wherein said compressed fluid supplying means is installed on a vehicle body, operation of said compressed fluid supplying means being controllable at driver's seat.

* * * * *